United States Patent Office 2,838,490
Patented June 10, 1958

2,838,490
6-FLUORO ANDROSTENES

John C. Babcock, Portage Township, Kalamazoo County, J Allan Campbell and John A. Hogg, Kalamazoo Township, Kalamazoo County, and Raymond L. Pederson, Kalamazoo, Mich., assignors to The Upjohn Company, Kalamazoo, Mich., a corporation of Michigan No Drawing. Application November 29, 1957
Serial No. 699,448

8 Claims. (Cl. 260—239.5)

The present invention relates to new steroids and is more particularly concerned with certain 6-fluoro-17β-hydroxy-17α-lower alkenyl hydrocarbon-4-androsten-3-ones and the 17-acylates thereof, such as, 6-fluoro-17β-hydroxy - 17(α - methallyl) - 4 - androsten - 3 - ones [6-fluoro - 17 - (α - methallyl) - testosterones], 19 - nor - 6-fluoro - 17β - hydroxy - 17 - (α - methallyl) - 4 - androsten - 3 - ones [6 - fluoro - 17 - (α - methallyl) - 19 - nortestosterones], the 17-acylates thereof and novel steroid intermediates and methods used in the preparation thereof.

The novel end product compounds of this invention are represented by the formula:

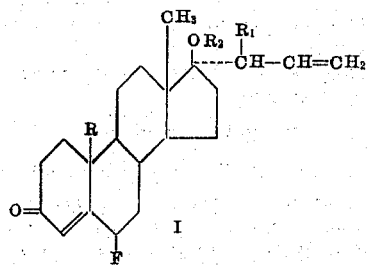

wherein R is methyl or hydrogen, R₁ is hydrogen or a lower alkyl radical and R₂ is hydrogen or an acyl radical of an organic carboxylic acid, preferably a hydrocarbon carboxylic acid, containing from one to twelve carbon atoms, inclusive. The term "lower alkyl radical," as used herein refers to an alkyl radical of from one to three carbon atoms, inclusive, e. g., methyl, ethyl, propyl and isopropyl.

It is an object of the instant invention to provide novel 6-fluoro-17β-hydroxy-17α-lower alkenyl hydrocarbon-4-androsten-3-ones and the 17-acylates thereof, such as, the 6 - fluoro - 17 - (α - methallyl) - testosterones, 19 - nor - 6 - fluoro - 17 - (α - methallyl) - testosterones and the 17-acylates thereof and novel intermediates and methods in the production thereof. Other objects of this invention will be apparent to those skilled in the art to which this invention pertains.

The novel end products of this invention, the compounds of Formula I, possess useful therapeutic properties as orally and parenterally active progestational agents. They affect the secretion of gonadotropins and thus regulate ovulation and endometrial and placental development and, particularly when used in conjunction with estrogens, e. g., ethinylestradiol and/or androgens, e. g., "Halotestin" (9α - fluoro - 11β - hydroxy - 17 - methyltestosterone), reduce fertility and constitute effective therapy for dysmenorrhea, amenorrhea, endometriosis, threatened abortion and related gynocological disorders. Administration of these steroids can be in conventional dosage forms such as pills, tablets, capsules, syrups or elixirs for oral use, or in liquid forms which are adaptable to the natural and synthetic steroid hormones for injectable products. Microcrystalline aqueous suspensions or oil solutions can be prepared for parenteral dosage.

The novel steroids of Formula I can be prepared according to the following reaction sequence:

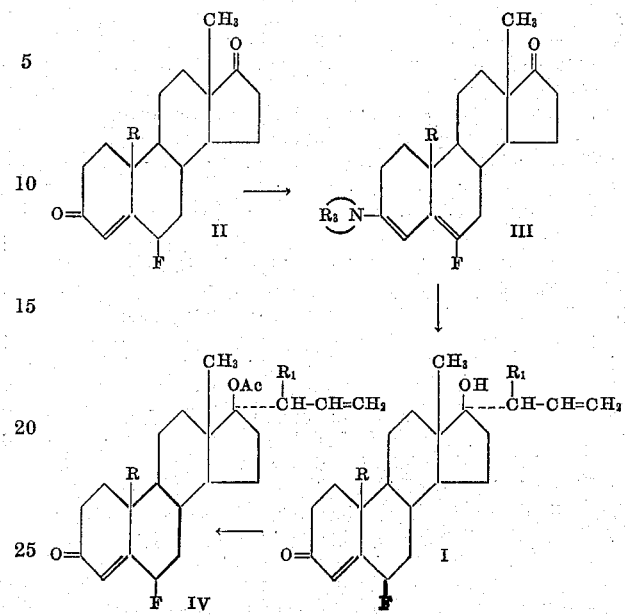

wherein R and R₁ have the same meaning as previously given, Ac is the acyl radical of an organic carboxylic acid, preferably a hydrocarbon carboxylic acid, containing from one to twelve carbon atoms, inclusive, and R₃ is an alkylene group which, together with the nitrogen atoms, forms a ring containing from five to six members, inclusive, and which preferably contains less than nine carbon atoms.

The process of the present invention comprises treating compounds of the type represented by Formula II, such as 6 - fluoro - 4 - androsten - 3,17 - diones and 19-nor - 6 - fluoro - 4 - androsten - 3,17 - diones with a secondary amine, such as pyrrolidine, to obtain the compounds of Formula III, such as 6 - fluoro - 3 - (N - pyrrolidinyl) - 3,5 - androstadien - 17 - ones and 19 - nor - 6 - fluoro - 3 - (N - pyrrolidinyl) - 3,5 - androstadien - 17 - ones. Other secondary amines and particularly secondary cyclic alkylene amines, such as piperidine, C-alkyl substituted piperidines, e. g., 2,4 - dimethylpyrrolidine, 3-isopropylpyrrolidine, 3,3-dimethylpyrrolidine and the like, are suitable to convert the compounds of Formula II into the corresponding 3-enamine compounds of Formula III.

The thus-obtained compounds of Formula III are then treated with a Grignard reagent, such as 2-butenyl-magnesium bromide (or chloride) to add the side chain at the 17α-position. The Grignard reagent is then decomposed using procedures well-known in the art. Preferably, ammonium chloride is used to decompose the Grignard reagent. Following the Grignard reagent decomposition, the 3-enamine group is removed by hydrolysis. The hydrolysis of 3-enamine group is preferably carried out using a buffered solution, such as a solution containing sodium acetate, water, glacial acetic acid and methanol. Alternatively, the 3-enamine group is hydrolyzed using mildly alkaline conditions, such as a sodium acetate solution. The compounds of formula I, such as 6-fluoro-17-(α-methallyl) - testosterones and 19 - nor - 6 - fluoro - 17(α - methallyl)-testosterones are then recovered from the solution used to hydrolyze the 3-enamine group according to procedures well-known in the art, such as by extraction with water-immiscible solvents, e. g., methylene chloride, ether, benzene or the like, followed by chromatography.

Other Grignard reagents, such as allylmagnesium bromide (or chloride) 2-pentenylmagnesium bromide (or chloride) 2-hexenylmagnesium bromide (or chloride) and 2-isohexenylmagnesium bromide are substituted for the 2-butenylmagnesium bromide disclosed above to prepare other compounds represented by Formula I, such as 6-fluoro-17-allyltestosterone and 19-nor-6-fluoro-17-allyltestosterone, 6-fluoro-17-($\alpha$-ethallyl)-testoterone and 19-nor-6-fluoro-17-($\alpha$-ethallyl)-testosterone, 6-fluoro-17-($\alpha$-propallyl)-testosterone, 19-nor-6-fluoro-17($\alpha$-propallyl)-testosterone, and 6-fluoro-17-($\alpha$-isopropallyl)-testosterones and 19-nor-6-fluoro-17-($\alpha$-isopropallyl)-testosterones, respectively.

Butenylmagnesium bromide and other alkyl substituted allylmagnesium halides are known to exist as equilibrium mixtures. Thus, butenylmagnesium bromide exists as a mixture of crotylmagnesium bromide (2-butenylmagnesium bromide) and $\alpha$-methallylmagnesium bromide. Accordingly, the Grignard reagents named above are to be understood as consisting of the equilibrium mixtures.

The 17-acylates represented by Formula IV, such as the 17-acylates of 6-fluoro-17-($\alpha$-methallyl)testosterone and 19-nor-6-fluoro-17($\alpha$-methallyl)testosterone are obtained by allowing the compounds of Formula I to react with the anhydride of an organic carboxylic acid, preferably a hydrocarbon carboxylic acid, containing from one to twelve carbon atoms, inclusive, for example, a saturated straight-chain aliphatic acid, e. g., acetic, propionic butyric, valeric, hexanoic, lauric, a saturated branched-chain aliphatic acid, e. g., trimethylacetic, isobutyric, isovaleric, a cycloaliphatic saturated acid, e. g., cyclohexanecarboxylic, an alkaryl acid, e. g., benzoic, phenylacetic, 2-phenyl-propionic, o-, m-, and p-toluic, a saturated dibasic acid (which can be converted into water-soluble, e. g., sodium, salts), e. g., succinic, adipic, a monobasic unsaturated acid, e. g., acrylic, crotonic, undecylenic, propiolic, cinnamic, dibasic unsaturated acids (which can be converted into water-soluble, e. g., sodium, salts), e. g., maleic citraconic.

The starting materials, the compounds of Formula II are prepared according to the procedures disclosed in Preparations 1 through 6 below.

The following examples are illustrative of the process and products of the present invention, but are not to be construed as limiting.

PREPARATION 1

A. *17β-hydroxy-5-androsten-3-one 3-ethylene ketal (testosterone 3-ethylene ketal)*

To thirty grams of 17β-hydroxy-4-androsten-3-one (testosterone) there was added 2.5 grams of p-toluenesulfonic acid, 200 milliliters of ethylene glycol and 500 milliliters of benzene. The solution was then refluxed for 28 hours, the condensate being passed through a Dean-Stark trap to separate the water. The reaction mixture was washed with dilute sodium bicarbonate solution and then with water. Each of the washes was then individually backwashed with benzene and the benzene layers so obtained were combined and added to the reaction mixture. The combined benzene solutions were then dried over magnesium sulfate, filtered, and concentrated to dryness. The dried product was then dissolved in 200 milliliters of hot methanol, to which there was added twenty milliliters of pyrrolidine to convert unreacted testosterone to its pyrrolidyl enamine. The solution was then concentrated to about 100 milliliters, diluted with methylene chloride, extracted with ice cold 4 N hydrochloric acid and water, the water-soluble testosterone pyrrolidyl enamine hydrochloride formed going into the aqueous layer. The aqueous layer was rapidly separated from the methylene chloride layer and the latter layer was dried over magnesium sulfate, filtered, and concentrated to dryness. The product so obtained was recrystallized from a methanol-ether mixture to which there had been added a few drops of pyridine. The first crop of crystals obtained weighed 7.3 grams, melted at 186–189 degrees centigrade, and had an optical rotation of $[\alpha]_D$ minus 42 degrees ($CHCl_3$). The second crop of crystals obtained weighed one gram and had a melting point of 178–184 degrees centigrade.

B. *5,6-oxido-17β-hydroxyandrostan-3-one 3-ethylene ketals*

To a solution of 8.5 grams of the above obtained ketal in 140 milliliters of chloroform there was added one gram of sodium acetate (anhydrous) and ten milliliters of peracetic acid solution (forty percent) whilst cooling in an ice bath. After standing for two hours, the solution was washed with cold dilute sodium hydroxide and water, dried over magnesium sulfate, filtered, and concentrated to dryness. The α and β-oxides produced were then separated by chromatography through 200 grams of synthetic magnesium silicate (Florisil). Elution using 250-milliliter fractions containing increasing amounts of acetone in Skellysolve B hexanes gave first the β-oxide (10% acetone, Fractions 7 to 12) and then the α-oxide (15% acetone, Fractions 13 to 21). The yields were 3.4 and 4.0 grams, respectively.

Recrystallization of the α-oxide (5α, 6α-oxido-17β-hydroxyandrostan-3-one 3-ethylene ketal) from acetone-Skellysolve B hexanes gave a product melting at 205–208 degrees centigrade and having an $[\alpha]_D$ minus 68 degrees ($CHCl_3$).

*Anal.*—Calculated for $C_{21}H_{32}O_4$: C, 72.38; H, 9.26. Found: C, 72.32; H, 9.31.

Recrystallization of the β-oxide (5β,6β-oxido-17β-hydroxyandrostan-3-one 3-ethylene ketal) from ether-Skellysolve B hexanes gave a product melting at 91–95 degrees centigrade and having an $[\alpha]_D$ minus three degrees ($CHCL_3$).

*Anal.*—Calculated for $C_{21}H_{32}O_4$: C, 72.38; H, 9.26. Found: C, 72.36; H, 9.76.

PREPARATION 2

*6β-fluoro-5α,17β-dihydroxyandrostan-3-one*

14.3 grams of the α-oxide (5α,6α-oxido-17β-hydroxyandrostan-3-one 3-ethylene ketal) was dissolved in 270 milliliters of methylene chloride and cooled to about eight degrees centigrade. 55 milliliters of 48 percent aqueous hydrofluoric acid were added whilst the reaction mixture was stirred and cooled in an ice bath. After stirring vigorously for two and one-half hours the reaction mixture was poured into 1500 milliliters of ten percent sodium bicarbonate solution containing ice. The mixture was filtered and the filtrate separated into an aqueous layer and methylene chloride layer. The methylene chloride layer was washed with water, dried over sodium sulfate and then evaporated. There was thus obtained 4.4 grams of material which was then redissolved in methylene chloride and adsorbed on 230 grams of Florisil (synthetic magnesium silicate). Elution, using 230-milliliter fractions, was then carried out with a mixture composed of six parts of acetone, thirty parts of Skellysolve B hexanes and 64 parts of methylene chloride, by volume. Fractions 5 to 12 were combined and recrystallized from acetone to give 1.04 grams of 6β-fluoro-5α,17β-dihydroxyandrostan-3-one melting at 253–254 degrees centigrade and having an $[\alpha]_D$ plus two degrees (acetone).

*Anal.*—Calcd. for $C_{19}H_{29}FO_3$: C, 70.34; H, 9.01; F, 5.86. Found: C, 70.44; H, 9.04; F, 5.96.

PREPARATION 3

*6β-fluoro-5α-hydroxyandrostane-3,17-dione*

To an ice-bath cooled solution of three grams of chromic anhydride in 130 milliliters of acetic acid and three milliliters of water, there was added, whilst stirring and cooling, four grams of 6β-fluoro-5α,17β-dihydroxyandrostan-3-one. After standing for fifteen minutes, the reaction mixture was warmed to about 25 degrees centigrade and allowed to stand for two and one-half hours. To the reaction mixture there was then added eleven milliliters of methyl alcohol and 300 milliliters of water, the addition of the latter causing a solid to precipitate. The precipitate was collected and washed with water to give 2.5 grams of crude product. Recrystallization from acetone-Skellysolve B hexanes gave 6β-fluoro-5α-hydroxyandrostane-3,17-dione.

Alternatively, 6β-fluoro-5α-hydroxyandrostane-3,17-dione is prepared by epoxidizing 3β-hydroxy-5-androsten-17-one (dehydroisoandrosterone) with peracetic acid to produce 3β-hydroxy-5α,6α-oxidoandrostan-17-one. Treatment of 3β-hydroxy-5α,6α-oxidoandrostan-17-one with anhydrous hydrogen fluoride in the presence of an anhydrous organic solvent, preferably a mixture of chloroform and tetrahydrofuran, is productive of 6β-fluoro-3β,5α-dihydroxyandrostan-17-one. The latter compound is then oxidized with chromic anhydride in acetic acid to produce 6β-fluoro-5α-hydroxyandrostane-3,17-dione.

PREPARATION 4

6β-fluoro-4-androstene-3,17-dione

A reaction mixture consisting of one gram of 6β-fluoro-5α-hydroxyandrostane-3,17-dione and one gram of N-bromoacetamide dissolved in ten milliliters of pyridine is allowed to stand for thirty minutes, then is cooled in an ice bath and stirred while a stream of anhydrous sulfur dioxide is passed over the surface until 1.5 to 1.6 grams of sulfur dioxide is absorbed. The thus-obtained reaction mixture is warmed to about 28 degrees centigrade and allowed to stand for one and one-half hours. The reaction mixture is then cooled and dilute aqueous sulfuric acid is added, giving a precipitate of 6β-fluoro-4-androstene-3,17-dione.

PREPARATION 5

6α-fluoro-4-androstene-3,17-dione

A mixture of 300 milligrams of 6β-fluoro-4-androstene-3,17-dione and ten milliliters of reagent grade chloroform (containing traces of alcohol) is cooled in an ice-salt bath and anhydrous hydrogen chloride is bubbled through for twenty minutes, followed by nitrogen for fifteen minutes. The resulting solution is washed with water, giving an aqueous and an organic layer, and the organic layer is evaporated to dryness yielding 6α-fluoro-4-androstene-3,17-dione.

Alternatively, dissolving 6β-fluoro-5α-hydroxyandrostane-3,17-dione, obtained according to the procedure of Preparation 3, in chloroform containing a trace of alcohol, cooling the solution to minus ten degrees centigrade and passing anhydrous hydrogen chloride gas through for two and one-half hours, then washing the chloroform solution with water and evaporating the resulting chloroform solution to dryness is productive of 6α-fluoro-4-androstene-3,17-dione.

PREPARATION 6

6-fluoro-4-(19-norandrostene)-3,17-dione

Substituting 19-nortestosterone for testosterone in Preparation 1, and treating the 19-nortestosterone with ethylene glycol in the presence of para-toluenesulfonic acid in the same manner shown in Preparation 1A is productive of 19-nortestosterone 3-ethylene ketal. Treating the latter compound with peracetic acid in the same manner shown in Preparation 1B is productive of 5α,6α-oxido-17β-hydroxy-19-norandrostan-3-one 3-ethylene ketal. In the same manner shown in Preparation 2, treating 5α,6α-oxido-17β-hydroxy-19-norandrostan-3-one with aqueous hydrofluoric acid yields 6β-fluoro-5α,17β-dihydroxy-19-norandrostan-3-one. Treating the latter compound with chromic anhydride in acetic acid, in the same manner as shown in Preparation 3, gives 6β-fluoro-5α-hydroxy-19-norandrostane-3,17-dione. In the same manner shown in Preparation 4, 6β-fluoro-5α-hydroxy-19-norandrostane-3,17-dione is dehydrated by treatment with N-bromoacetamide in pyridine followed by addition of sulfur dioxide, giving 6β-fluoro-4-(19-norandrostene)-3,17-dione. Finally, in the same manner shown in Preparation 5, treating a solution of 6β-fluoro-4-(19-norandrostene)-3,17-dione in chloroform containing a trace of alcohol with gaseous hydrogen chloride is productive of 6α-fluoro-4-(19-norandrostene)-3,17-dione. Alternatively, in the same manner shown in Preparation 5, treating 6β-fluoro-5α-hydroxy-19-norandrostane-3,17-dione in chloroform containing a trace of alcohol with gaseous hydrogen chloride is productive of 6α-fluoro-4-(19-norandrostene)-3,17-dione.

EXAMPLE 1

A. 6-fluoro-3-(N-pyrrolidinyl)-3,5-androstadien-17-one (II)

A solution of one gram of 6α-fluoro-4-androstene-3,17-dione in ten milliliters of methanol is warmed to near reflux temperature, then one milliliter of pyrrolidine is added and the mixture is warmed one minute, cooled, and scratched with a rod to induce crystallization. After chilling for one-half hour the precipitate of 6-fluoro-3-(N-pyrrolidinyl)-3,5-androstadien-17-one is collected by filtration, washed and dried.

In the same manner as shown above, treating 6β-fluoro-4-androstene-3,17-dione with pyrrolidine is productive of 6-fluoro-3-(N-pyrrolidinyl)-3,5-androstadien-17-one.

B. 6-fluoro-17β-hydroxy-17-(α-methallyl)-4-androsten-3-one

A solution of 0.100 mole of 2-butenylmagnesium bromide in thirty milliliters of diethyl ether is prepared according to the method of Young and Roberts, J. Am. Chem. Soc. 68, 1474 (1946), and is stirred under a nitrogen atmosphere while a solution of 3.73 grams of 6-fluoro-3-(N-pyrrolidinyl)-3,5-androstadien-17-one in fifty milliliters of tetrahydrofuran is added over a period of ten minutes. The mixture is distilled until the vapor temperature above the reaction mixture reaches 55 degrees centigrade and then heated at reflux for four hours. The mixture is poured carefully into iced ammonium chloride solution and the resulting mixture is extracted with ether. The ether extract is washed with water, dried over anhydrous sodium sulfate, and the solvent removed at room temperature or below under diminished pressure leaving a residue. The thus-obtained residue is heated at reflux for four hours in a buffered solution of six grams of sodium acetate, six milliliters of water, four milliliters of glacial acetic acid, and forty milliliters of methanol. This mixture is then diluted with water and extracted with ether. The ether extract is washed with water, dilute aqueous sodium carbonate, and water, then is dried over anhydrous sodium sulfate and evaporated to dryness, giving a crude product which is dissolved in methylene chloride and chromatographed over 100 grams of Florisil (synthetic magnesium silicate). The chromatogram column is eluted with Skellysolve B hexanes containing increasing proportions of acetone from one to fifty percent by volume. The eluted fractions are examined by infrared absorption analysis and those fractions which show no C-17 carbonyl absorption are combined and crystallized from acetone-hexane mixture to give 6α-fluoro-17β-hydroxy-17-(α-methallyl)-4-androsten-3-one [6α-fluoro-17-(α-methallyl)testosterone]. 6β-fluoro-17β-hydroxy-17-(α-methallyl)-4-androsten-3-one is present in the crystallization mother liquors, and is isolated by additional chromatography followed by crystallization from acetone-hexane mixture. In the manner shown in Example 1B, treating 6-fluoro-3-(N-pyrrolidinyl)-3,5-androstadien-17-one with allylmagnesium bromide and hydrolyzing the product in a buffered mixture is productive of 6-fluoro-17-allyltestosterone. Similarly, 6-fluoro-17-(α-ethallyl)testosterone, 6-fluoro-17-(α-propallyl)testosterone, and 6-fluoro-17-(α-isopropallyl)testosterone, are prepared by allowing 6-fluoro-3-(N-pyrrolidinyl)-3,5-androstadien-17-one to react with 2-pentenylmagnesium bromide, 2-hexenylmagnesium bromide or 2-isohexenylmagnesium bromide, respectively, and hydrolyzing the enamines as shown in Example 1B. Allylmagnesium bromide is obtained following the procedure of Young and Roberts, J. Am. Chem. Soc. 68, 1474 (1946) for the preparation of 2-butenylmagnesium bromide but substituting allyl bromide for 2-butenyl bromide. Similarly, 2-pentenylmagnesium bromide and 2-hexenylmagnesium bromide are prepared from 1-bromo-2-pentene and 1-bromo-2-hexene [Young, Richards and Azorlosa, J. Am. Chem. Soc. 61, 3070 (1939)], and 2-isohexenyl-magnesium bromide is prepared from 1-bromo-4-methyl-2-pentene (isopropylallyl bromide) (Bouis, Annales de Chimie, [10] 9, 412, 421).

C. *6-fluoro-17β-hydroxy-17-(α-methallyl)-4-androsten-3-one 17-propionate*

A solution containing one gram of 6α-fluoro-17β-hydroxy-17-(α-methallyl)-4-androsten-3-one in nine milliliters of propionic anhydride is heated under reflux for thirty minutes. The propionic anhydride is then removed by evaporation and the residue is crystallized from aqueous methanol to give 6α-fluoro-17β-hydroxy-17-(α-methallyl)-4-androsten-3-one 17-propionate. Treating 6β-fluoro-17β-hydroxy-17-(α-methallyl)-4-androsten-3-one with propionic anhydride as above is productive of 6β-fluoro-17β-hydroxy-17-(α-methallyl)-4-androsten-3-one 17-propionate.

In the same manner shown above 6-fluoro-17β-hydroxy-17(α-methallyl)-4-androsten-3-one 17-cyclopentylpropionate, 6-fluoro-17β-hydroxy-17-(α-methallyl)-4-androsten-3-one 17-acetate, 6-fluoro-17β-hydroxy-17-(α-methallyl)-4-androsten-3-one 17-butyrate, 6-fluoro-17β-hydroxy-17-(α-methallyl)-4-androsten-3-one 17-valerate, 6-fluoro-17β-hydroxy-17-(α-methallyl)-4-androsten-3-one 17-hexanoate, 6-fluoro-17β-hydroxy-17-(α-methallyl)-4-androsten-3-one 17-laurate, 6-fluoro-17-β-hydroxy-17-(α-methallyl)-4-androsten-3-one 17-trimethylacetate, 6-fluoro-17β-hydroxy-17-(α-methallyl)-4-androsten-3-one 17-isobutyrate, 6-fluoro-17β-hydroxy-17-(α-methallyl)-4-androsten-3-one 17-isovalerate, 6-fluoro-17β-hydroxy-17-(α-methallyl)-4-androsten-3-one 17-cyclohexane-carboxylate, 6-fluoro-17β-hydroxy-17-(α-methallyl)-4-androsten-3-one 17-benzoate, 6-fluoro-17β-hydroxy-17-(α-methallyl)-4-androsten-3-one 17-phenylacetate, 6-fluoro-17β-hydroxy-17-(α-methallyl)-4-androsten-3-one 17-(β-phenylpropionate), 6-fluoro-17β-hydroxy-17-(α-methallyl)-4-androsten-3-one 17-(o-, m-, p-toluate), 6-fluoro-17β-hydroxy-17(α-methallyl)-4-androsten-3-one, 17-hemisuccinate, 6-fluoro-17β-hydroxy-17-(α-methallyl)-4-androsten-3-one 17-hemiadipate, 6-fluoro-17β-hydroxy-17-(α-methallyl)-4-androsten-3-one 17-acrylate, 6-fluoro-17β-hydroxy-17-(α-methallyl)-4-androsten-3-one 17-crotonate, 6-fluoro-17β-hydroxy-17-(α-methallyl)-4-androsten-3-one 17-undecylenate, 6-fluoro-17β-hydroxy-17-(α-methallyl)-4-androsten-3-one 17-propiolate, 6-fluoro-17β-hydroxy-17-(α-methallyl)-4-androsten-3-one 17-cinnamate, 6-fluoro-17β-hydroxy-17-(α-methallyl)-4-androsten-3-one 17-maleate, 6-fluoro-17β-hydroxy-17-(α-methallyl)-4-androsten-3-one 17-citraconate, 6-fluoro-17β-hydroxy-17-(α-methallyl)-4-androsten-3-one 17-trifluoroacetate, 6-fluoro-17β-hydroxy-17-(α-methallyl)-4-androsten-3-one 17-chloroacetate, 6-fluoro-17β-hydroxy-17-(α-methallyl)-4-androsten-3-one 17-(α- and β-propionate), and 6-fluoro-17β-hydroxy-17-(α-methallyl)-4-androsten-3-one 17-iodobenzoate are prepared by dissolving 6-fluoro-17β-hydroxy-17-(α-methallyl)-4-androsten-3-one in the appropriate acid anhydride and heating, for example, at between 100 and 150 degrees centigrade. The crude ester is isolated in accordance with the procedure above and recrystallized to give the 6-fluoro-17β-hydroxy-17-(α-methallyl)-4-androsten-3-one ester. If the corresponding acid anhydride is solid, an inert solvent such as toluene, xylene, or dioxane can be added to effect solution and to provide a liquid esterification reaction medium.

The 17-propionates of 6-fluoro-17β-hydroxy-17-allyl-4-androsten-3-one, 6-fluoro-17β-hydroxy-17-(α-ethallyl)-4-androsten-3-one, 6-fluoro-17β-hydroxy-17-(α-propallyl)-4-androsten-3-one, and 6-fluoro-17β-hydroxy-17-(α-isopropallyl)-4-androsten-3-one are obtained in the same manner as in Example 1C by treating the corresponding steroid with propionic anhydride. Other 17-acylates of 6-fluoro-17β-hydroxy-17-allyl-4-androsten-3-one, 6-fluoro-17β-hydroxy-17-(α-ethallyl)-4-androsten-3-one, 6-fluoro-17β-hydroxy-17-(α-propallyl)-4-androsten-3-one and 6-fluoro-17β-hydroxy-17-(α-isopropallyl)-4-androsten-3-one are produced in the same manner as in Example 1C by dissolving 6-fluoro-17β-hydroxy-17-allyl-4-androsten-3-one, 6-fluoro-17β-hydroxy-17-(α-ethallyl)-4-androsten-3-one, 6-fluoro-17β-hydroxy-17-(α-propallyl)-4-androsten-3-one or 6-fluoro-17-β-hydroxy-17-(α-isopropallyl)-4-androsten-3-one in the appropriate acid anhyride and heating, for example, at between 100 and 150 degrees centigrade. The crude ester is isolated and crystallized in accordance with the procedure of Example 1C.

EXAMPLE 2

A. *19 - nor - 6 - fluoro - 3 - (N - pyrrolidinyl) - 3,5 - androstadien-17-one*

In the same manner shown in Example 1A, treating 19-nor-6α-fluoro-4-androstene-3,17-dione or 19-nor-6β-fluoro-4-androstene-3,17-dione with pyrrolidine is productive of 19-nor-6-fluoro-3-(N-pyrrolidinyl)-3,5-androstadien-17-one.

B. *19 - nor - 6 - fluoro - 17β - hydroxy - 17 - (α - methallyl)-4-androsten-3-one*

In the same manner shown in Example 1B, treating 19-nor - 6 - fluoro - 3 - (N - pyrrolidinyl) - 3,5 - androstadien-17-one with 2-butenylmagnesium bromide, hydrolyzing the Grignard reaction mixture with aqueous ammonium chloride, and hydrolyzing the resulting enamine with a mixture of sodium acetate, acetic acid, water and methanol is productive of 19-nor-6α-fluoro-17β-hydroxy-17-(α-methallyl)-4-androsten-3-one and 19-nor-6β-fluoro-17β-hydroxy-17-(α-methallyl)-4-androsten-3-one. Substituting allylmagnesium bromide, 2-pentenylmagnesium bromide, 2-hexenylmagnesium bromide, or 2-isohexenylmagnesium bromide for 2-butenylmagnesium bromide in the above process is productive of the corresponding 19-nor - 6 - fluoro - 17β - hydroxy - 17 - allyl - 4 - androsten-3-one, 19-nor-6-fluoro-17β-hydroxy-17-(α-ethallyl)-4-androsten-3-one, 19-nor-6-fluoro-17β-hydroxy-17-(α-propallyl)-4-androsten-3-one and 19-nor-6-fluoro-17β-hydroxy-17-(α-isopropallyl)-4-androsten-3-one.

C. *19 - nor - 6 - fluoro - 17β - hydroxy - 17 - (α - methallyl)-4-androsten-3-one 17-propionate*

In the same manner shown in Example 1C, treating 19 - nor - 6 - fluoro - 17β - hydroxy - 17 - (α - methallyl)-4-androsten-3-one with propionic anhydride is productive of 19-nor-6-fluoro-17β-hydroxy-17-(α-methallyl)-4-androsten-3-one 17-propionate.

In a like manner other 17-acylates are prepared by dissolving 19-nor-6-fluoro-17β-hydroxy-17-(α-methallyl)-4-androsten-3-one in the appropriate acid anhydride, heating, for example, at between 100 and 150 degrees centigrade and isolating the product as shown in Example 1C.

The 17-propionates of 19-nor-6-fluoro-17β-hydroxy-17-allyl-4-androsten-3-one, 19-nor-6-fluoro-17β-hydroxy-17-(α-ethallyl)-4-androsten-3-one, 19-nor-6-fluoro-17β-hydroxy-17-(α-propallyl)-4-androsten-3-one, and 19-nor-6-fluoro-17β-hydroxy-17-(α-isopropallyl)-4-androsten-3-one are obtained in the same manner as in Example 1C by treating the corresponding steroid with propionic anhydride. Other 17-acylates of 19-nor-6-fluoro-17β-hydroxy-17-allyl-4-androsten-3-one, 19-nor-6-fluoro-17β-hydroxy-17-(α-ethallyl)-4-androsten-3-one, 19-nor-6-fluoro-17β-hydroxy-17-(α-propallyl)-4-androsten-3-one and 19- nor- 6 - fluoro - 17β - hydroxy - 17 - (α - isopropallyl) - 4-androsten-3-one are produced in the same manner as in Example 1C by dissolving 19-nor-6-fluoro-17β-hydroxy-17-allyl-4-androsten-3-one, 19-nor-6-fluoro-17β-hydroxy-17-(α-ethallyl)-4-androsten-3-one, 19-nor-6-fluoro-17β-hydroxy-17-(α-propallyl)-4-androsten-3-one and 19-nor-6 - fluoro - 17β - hydroxy - 17 - (α - isopropallyl) - 4 - androsten-3-one in the appropriate acid anhydride and heating, for example, at between 100 and 150 degrees centigrade. The crude ester is isolated and crystallized in accordance with the procedure in Example 1C.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. A compound of the formula:

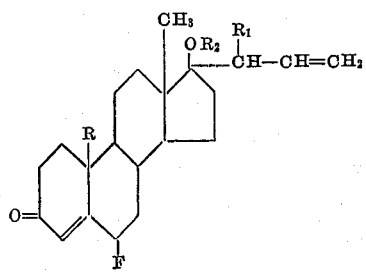

wherein R is selected from the group consisting of methyl and hydrogen, $R_1$ is selected from the group consisting of hydrogen and a lower alkyl radical containing from one to three carbon atoms, inclusive, and $R_2$ is selected from the group consisting of hydrogen and the acyl radical of a hydrocarbon carboxylic acid containing from one to twelve carbon atoms, inclusive.

2. 6 - fluoro - 17β - hydroxy - 17-(α - methallyl) - 4-androsten-3-one.
3. 6α - fluoro - 17β - hydroxy - 17 - (α - methallyl) - 4-androsten-3-one.
4. 6 - fluoro - 17β - hydroxy - 17 - (α - methallyl) - 4-androsten-3-one 17-acylates in which the acyl radical is that of a hydrocarbon carboxylic acid containing from one to twelve carbon atoms, inclusive.
5. 6α - fluoro - 17β - hydroxy - 17 - (α - methallyl) - 4-androsten-3-one 17-acylates in which the acyl radical is that of a hydrocarbon carboxylic acid containing from one to twelve carbon atoms, inclusive.
6. 6α - fluoro - 17β - hydroxy - 17 - (α - methallyl) - 4-androsten-3-one 17-propionate.
7. A compound of the formula:

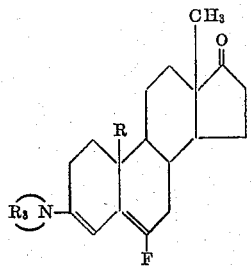

wherein R is selected from the group consisting of methyl and hydrogen and $R_3$ is an alkylene group containing less than nine carbon atoms and having a four to five carbon atom bridge between the valences which, together with the nitrogen atom, forms a ring which contains from five to six members, inclusive.

8. 6 - fluoro - 3 - (N - pyrrolidinyl) - 3,5 - androstadien-17-one.

No references cited.